US012374485B2

(12) United States Patent
Takahashi

(10) Patent No.: US 12,374,485 B2
(45) Date of Patent: Jul. 29, 2025

(54) INDUCTOR COMPONENT

(71) Applicant: Murata Manufacturing Co., Ltd., Kyoto-fu (JP)

(72) Inventor: Daisuke Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 624 days.

(21) Appl. No.: 17/689,780

(22) Filed: Mar. 8, 2022

(65) Prior Publication Data

US 2022/0319762 A1 Oct. 6, 2022

(30) Foreign Application Priority Data

Apr. 5, 2021 (JP) ................................ 2021-064357

(51) Int. Cl.
*H01F 27/28* (2006.01)
*H01F 27/29* (2006.01)

(52) U.S. Cl.
CPC . *H01F 27/2804* (2013.01); *H01F 2027/2809* (2013.01); *H01F 27/292* (2013.01)

(58) Field of Classification Search
CPC ............... H01F 27/2804; H01F 27/292; H01F 2027/2809
See application file for complete search history.

(56) References Cited

U.S. PATENT DOCUMENTS

2015/0014042 A1* 1/2015 Noguchi ................ H05K 1/165 174/262
2016/0217905 A1* 7/2016 Yang ...................... H05K 1/113
2016/0248149 A1* 8/2016 Kim ........................ H05K 1/115
2017/0018351 A1* 1/2017 Yatabe ................ H01F 27/2804
2017/0025219 A1* 1/2017 Nagai ................. H01F 17/0013
2017/0345552 A1* 11/2017 Nakano ................. H01F 41/043
2019/0096561 A1* 3/2019 Nagai ................. H01F 17/0013
2019/0244740 A1* 8/2019 Song ..................... H01F 27/292
2019/0304667 A1* 10/2019 Hirukawa ............. H01F 27/292
2020/0027637 A1* 1/2020 Sano ................... H01F 17/0013

FOREIGN PATENT DOCUMENTS

CN 108428532 A 8/2018
CN 110739133 A 1/2020
JP H06-181122 A 6/1994

(Continued)

*Primary Examiner* — Malcolm Barnes
(74) *Attorney, Agent, or Firm* — Studebaker Brackett PLLC

(57) ABSTRACT

An inductor component comprising an element body; and a coil in the element body and helically wound along an axial direction. The coil includes a first coil wiring wound along a plane orthogonal to the axial direction, a second coil wiring adjacent to the first coil wiring in the axial direction and wound along a plane orthogonal to the axial direction, and a via electrode connecting the first and second coil wirings. The first and second coil wirings have first and second thick portions, respectively, each having an aspect ratio greater than 1.00, and first and second thin portions, respectively, that are end portions of the first and second coil wirings having an average thickness smaller than the thickness of the first and second thick portions, respectively. The via electrode connects the first and second thin portions.

21 Claims, 9 Drawing Sheets

(56) References Cited

FOREIGN PATENT DOCUMENTS

| | | | | |
|---|---|---|---|---|
| JP | 2000216514 | A | * | 8/2000 |
| JP | 2016-225611 | A | | 12/2016 |
| JP | 2017-034240 | A | | 2/2017 |
| JP | 2017034176 | A | * | 2/2017 |
| JP | 2018-133397 | A | | 8/2018 |
| JP | 2019-029372 | A | | 2/2019 |
| JP | 2019-057581 | A | | 4/2019 |
| JP | 2020-013952 | A | | 1/2020 |

* cited by examiner

INDUCTOR COMPONENT

CROSS REFERENCE TO RELATED APPLICATION

This application claims benefit of priority to Japanese Patent Application 2021-064357, filed Apr. 5, 2021, the entire content of which is incorporated herein by reference.

BACKGROUND

Technical Field

The present disclosure relates to an inductor component.

Background Art

A conventional inductor component is described in Japanese Laid-Open Patent Publication No. 2019-57581. This inductor component includes an element body and a coil disposed in the element body and helically wound along an axial direction. The coil has multiple coil wirings wound along a plane orthogonal to the axial direction, and a via electrode connecting adjacent coil wirings. The aspect ratio of the coil wiring is 1.0 or more. The aspect ratio of the coil wiring is (thickness of the coil wiring in the axial direction)/(width of the coil wiring).

SUMMARY

In the inductor component disclosed in Japanese Laid-Open Patent Publication No. 2019-57581, a via electrode is connected to adjacent coil wirings along an axial direction. When the aspect ratio of the coil wiring is larger, the thickness of the coil wiring in the axial direction becomes larger. The coil wiring contracts during firing. Therefore, in the inductor component of Japanese Laid-Open Patent Publication No. 2019-57581 in which the thickness of the coil wiring in the axial direction is large, an amount of contraction in the axial direction of the coil wiring is also large during firing, and a large stress is generated in the axial direction in the via electrode, so that the via electrode may peel off from the coil wiring.

Therefore, the present disclosure is to provide an inductor component capable of reducing a stress of a via electrode generated during firing.

Accordingly, an aspect of the present disclosure provides an inductor component comprising an element body; and a coil disposed in the element body and helically wound along an axial direction. The coil includes a first coil wiring wound along a plane orthogonal to the axial direction, a second coil wiring adjacent to the first coil wiring in the axial direction and wound along a plane orthogonal to the axial direction, and a via electrode connecting the first coil wiring and the second coil wiring. The first coil wiring has a first thick portion having an aspect ratio greater than 1.00, and a first thin portion that is an end portion of the first coil wiring and that has an average thickness smaller than the thickness of the first thick portion. The second coil wiring has a second thick portion having an aspect ratio greater than 1.00, and a second thin portion that is an end portion of the second coil wiring and that has an average thickness smaller than the thickness of the second thick portion. The via electrode connects the first thin portion and the second thin portion.

The axial direction refers to a direction parallel to a central axis of a helix formed by winding the coil. The aspect ratio is (thickness of the first thick portion)/(width of the first thick portion). The thickness of the first thick portion refers to a thickness in the axial direction of the coil in a cross section orthogonal to the extending direction of the first thick portion. The width of the first thick portion refers to a dimension in a direction orthogonal to the axial direction of the coil in a cross section orthogonal to the extending direction of the first thick portion. The aspect ratio of the second thick portion is similarly defined.

The average thickness of the first thin portion is (cross-sectional area of the first thin portion)/(wiring length of the first thin portion along the extending direction of the first thin portion in a cross section of the first thin portion). The cross-sectional area of the first thin portion refers to an area of a cross section that is parallel to the axial direction of the coil, that includes the center of the via electrode when viewed in the axial direction of the coil, and that is parallel to the extending direction of the first thin portion. The average thickness of the second thin portion is similarly defined.

According to the embodiment, the via electrode is connected to the first thin portion and the second thin portion. Since the first thin portion and the second thin portion have average thicknesses smaller than thicknesses of the first thick portion and the second thick portion, respectively, an amount of contraction in the axial direction during firing becomes smaller. Therefore, a stress of the via electrode generated during firing can be reduced.

Preferably, in an embodiment of the inductor component, the via electrode has a central axis inclined relative to the axial direction.

The central axis of the via electrode refers to a line passing through the center of the via electrode in a direction in which the via electrode extends from the first thin portion toward the second thin portion.

According to the embodiment, since the via electrode is inclined, the stress generated in the via electrode during firing can be dispersed in the inclined direction.

Preferably, in an embodiment of the inductor component, the via electrode has a central axis inclined stepwise relative to the axial direction due to alternate repetition of a portion extending in a direction parallel to the axial direction and a portion extending in a direction orthogonal to the axial direction.

According to the embodiment, the inclined via electrode can easily be manufactured by using a photolithography step. Since the via electrode is inclined relative to the axial direction, the stress generated in the via electrode during firing can be dispersed in the inclined direction.

Preferably, in an embodiment of the inductor component, the first thin portion has a thickness decreasing along the extending direction of the first coil wiring, which is a direction from an end portion opposite to the end portion of the first coil wiring toward the end portion.

The thickness of the first thin portion refers to the thickness in the axial direction of the coil in a cross section orthogonal to the extending direction of the first thin portion. The decrease in the thickness of the first thin portion refers to a stepwise or continuous decrease in the thickness of the first thin portion.

According to the embodiment, since the thickness of the first thin portion decreases along the direction, the stress generated in the via electrode during firing can be dispersed.

Preferably, in an embodiment of the inductor component, the thickness of the first thin portion continuously decreases.

According to the embodiment, the stress generated in the via electrode during firing can more effectively be dispersed.

Preferably, in an embodiment of the inductor component, the second thin portion has a thickness decreasing along the extending direction of the second coil wiring, which is a direction from an end portion opposite to the end portion of the second coil wiring toward the end portion.

The thickness of the second thin portion refers to the thickness in the axial direction of the coil in a cross section orthogonal to the extending direction of the second thin portion. The decrease in the thickness of the second thin portion refers to a stepwise or continuous decrease in the thickness of the second thin portion.

According to the above embodiment, since the thickness of the second thin portion decreases along the direction, the stress generated in the via electrode during firing can be dispersed.

Preferably, in an embodiment of the inductor component, the thickness of the second thin portion continuously decreases.

According to the embodiment, the stress generated in the via electrode during firing can more effectively be dispersed.

Preferably, in an embodiment of the inductor component, the surface of the element body includes a first end surface, a second end surface opposite to the first end surface, a bottom surface connected between the first end surface and the second end surface, and a top surface opposite to the bottom surface. The inductor component further includes a first external electrode disposed to extend from the first end surface to the bottom surface, and a second external electrode disposed to extend from the second end surface to the bottom surface. The coil is disposed so that the axial direction is parallel to the first end surface, the second end surface, the bottom surface, and the top surface. One end of the coil is connected to the first external electrode while the other end of the coil is connected to the second external electrode, and the via electrode is arranged so that a distance between the via electrode and the bottom surface is 50% or less of a distance between the bottom surface and the top surface.

According to the embodiment, since the via electrode is arranged within 50% or less of the distance between the bottom surface and the top surface, the first thin portion and the second thin portion having a relatively small average thickness are also arranged at a position within 50% or less of the distance between the bottom surface and the top surface. This can reduce an influence of stray capacitance between a substrate on which the first external electrode and the second external electrode or the inductor component is mounted and the via electrode. In contrast, when the coil wirings are made up only of the thick portions, the influence of the stray capacitance becomes larger.

Preferably, in an embodiment of the inductor component, at least one of the first thick portion and the second thick portion has an aspect ratio of 1.08 or more and 2.54 or less (i.e., from 1.08 to 2.54).

According to the embodiment, the Q value can be increased.

Preferably, in an embodiment of the inductor component, at least one of the first thin portion and the second thin portion has an aspect ratio of 1.00 or less.

The aspect ratio of the first thin portion is (average thickness of the first thin portion)/(width of the first thin portion). The width of the first thin portion refers to a dimension in a direction orthogonal to the axial direction of the coil in a cross section orthogonal to the extending direction of the first thin portion. The aspect ratio of the second thin portion is similarly defined.

According to the embodiment, the stress generated in the via electrode during firing can more effectively be reduced.

Preferably, in an embodiment of the inductor component, the first thin portion at least includes a portion corresponding to an entire region overlapping with the end portion side of the second coil wiring when viewed in the axial direction, on the end portion side of the first coil wiring, and the second thin portion at least includes a portion corresponding to an entire region overlapping with the end portion side of the first coil wiring when viewed in the axial direction, on the end portion side of the second coil wiring.

According to the embodiment, the stress generated in the via electrode during firing can more effectively be reduced.

Preferably, in an embodiment of the inductor component, the first thick portion and the first thin portion are adjacent to each other and integrally formed.

The phrase "integrally formed" means that two members are continuously formed and that no interface is formed.

According to the embodiment, the strength of the first coil wiring can be increased.

Preferably, in an embodiment of the inductor component, the second thick portion and the second thin portion are adjacent to each other and integrally formed.

According to the embodiment, the strength of the second coil wiring can be increased.

Preferably, in an embodiment of the inductor component, a shape of an end surface of the via electrode connected to each of the first thin portion and the second thin portion is circular, and the end surface has a diameter of 30 μm or more and 50 μm or less (i.e., from 30 μm to 50 μm).

According to the embodiment, an area of connection of the via electrode to the thin portions can be ensured, so that connection reliability can be improved.

The inductor component according to an aspect of the present disclosure can reduce the stress of the via electrode generated during firing.

DETAILED DESCRIPTION

An inductor component of an aspect of the present disclosure will now be described in detail with reference to shown embodiments. The drawings include schematics and may not reflect actual dimensions or ratios.

First Embodiment

Figure 1:
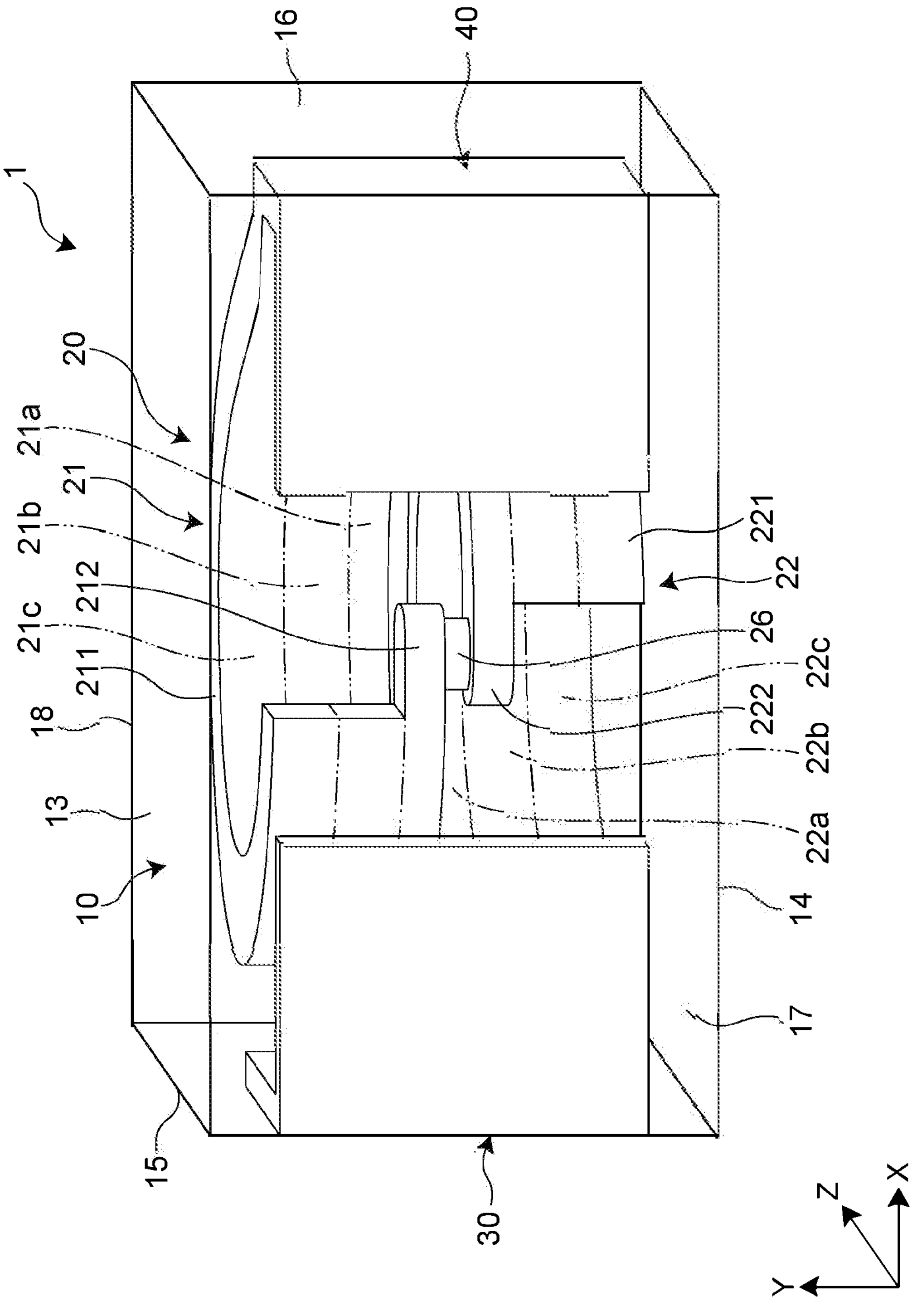
FIG. 1 is a transparent perspective view showing a first embodiment of an inductor component viewed from the bottom surface side.
Figure 2:
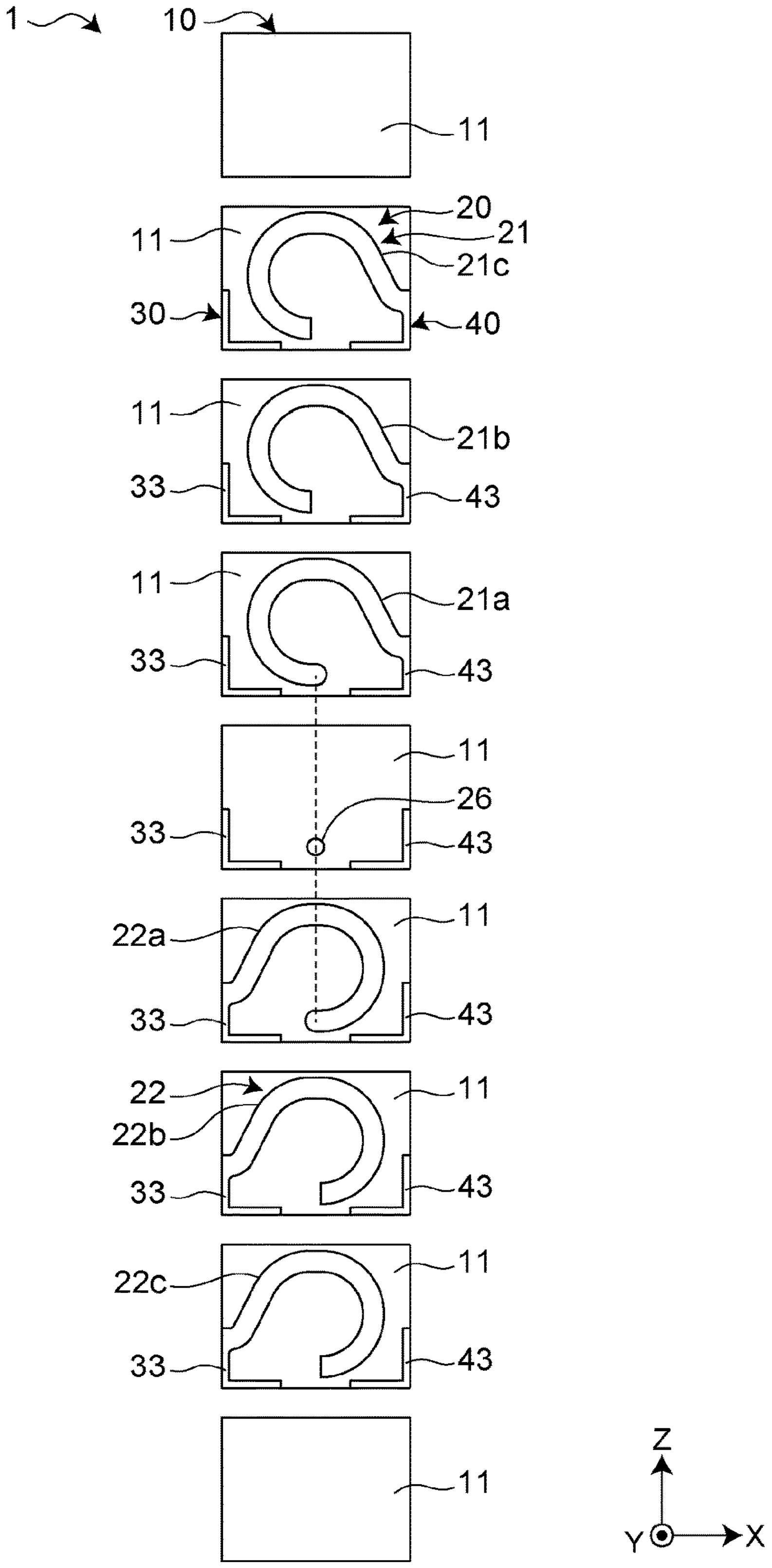
FIG. 2 is an exploded view of the inductor component.
Figure 3:
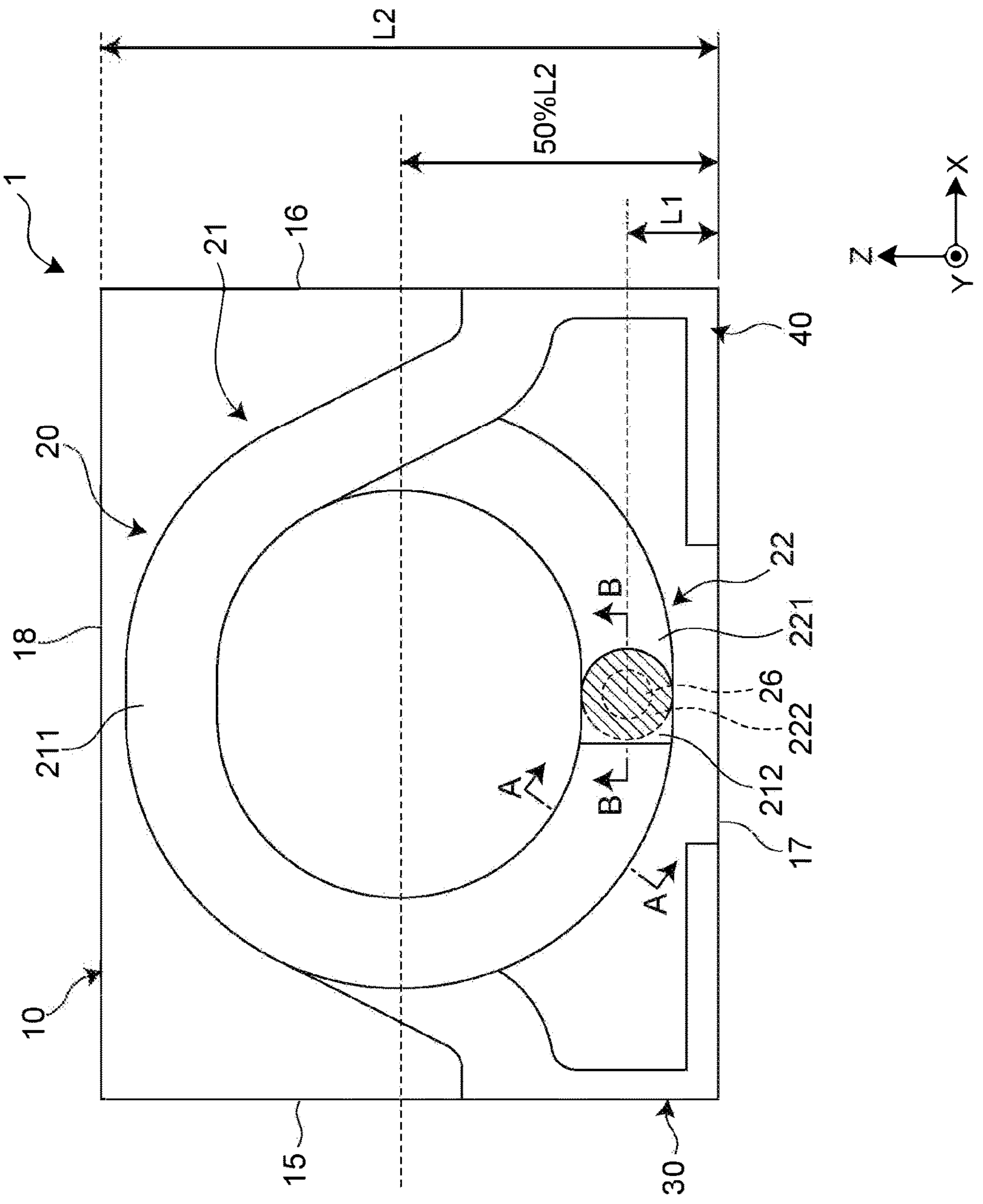
FIG. 3 is a transparent side view of the inductor component viewed from a first side surface.
Figure 4:
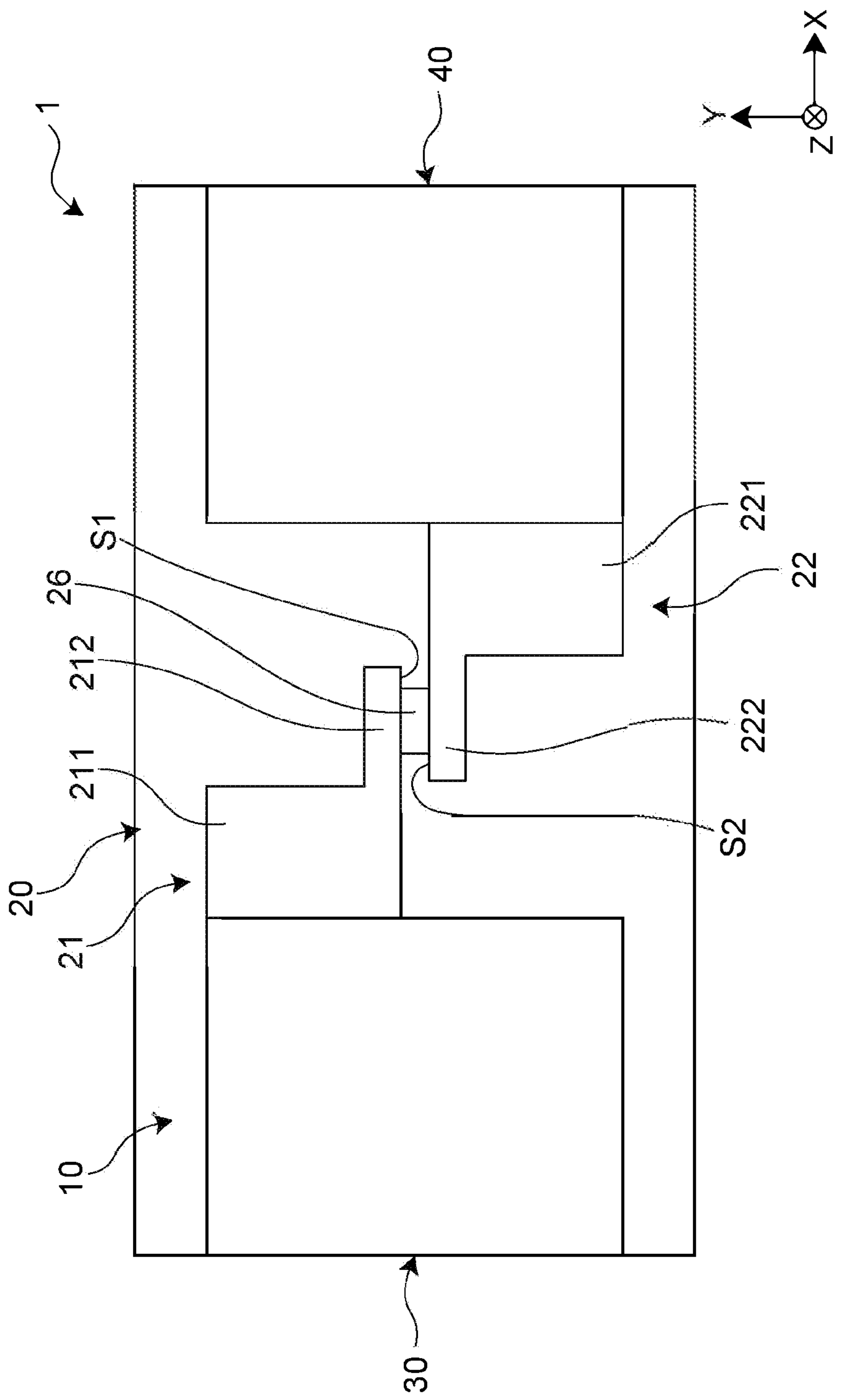
FIG. 4 is a transparent bottom view of the inductor component viewed from the bottom surface side.

FIG. 1 is a transparent perspective view showing a first embodiment of an inductor component viewed from the bottom surface side. FIG. 2 is an exploded view of the inductor component. FIG. 3 is a transparent side view of the inductor component viewed from a first side surface (i.e., in an axial direction of a coil). FIG. 4 is a transparent bottom view of the inductor component viewed from the bottom surface side.

As shown in FIGS. 1 to 4, the inductor component 1 has an element body 10, a coil 20 disposed in the element body 10 and helically wound along the axial direction, and a first external electrode 30 and a second external electrode 40 disposed in the element body 10 and electrically connected to the coil 20. In FIGS. 1, 3, and 4, the element body 10 is transparently drawn so that a structure can easily be understood; however, the element body may be semitransparent or opaque.

The inductor component 1 is electrically connected to a wiring of a circuit board not shown. The inductor component 1 is used as an impedance matching coil (matching coil) of a high-frequency circuit, for example, and is used for an electronic device such as a personal computer, a DVD player, a digital camera, a TV, a portable telephone, automotive electronics, and medical/industrial machinery. However, the inductor component 1 is not limited to these uses and is also usable for a tuning circuit, a filter circuit, and a rectifying/smoothing circuit, for example.

The element body 10 is formed into a substantially rectangular parallelepiped shape. The surface of the element body 10 includes a first end surface 15 and a second end surface 16 opposite to each other, a first side surface 13 and a second side surface 14 opposite to each other, a bottom surface 17 connected between the first end surface 15 and the second end surface 16 and between the first side surface 13 and the second side surface 14, and a top surface 18 opposite to the bottom surface 17. As shown in the figures, an X direction is a direction orthogonal to the first end surface 15 and the second end surface 16; a Y direction is a direction orthogonal to the first side surface 13 and the second side surface 14; and a Z direction is a direction orthogonal to the bottom surface 17 and the top surface 18 and is a direction orthogonal to the X direction and the Y direction.

The element body 10 is formed by laminating multiple insulating layers 11. The insulating layers 11 are made of, for example, a material mainly composed of borosilicate glass, a ferrite, a resin, etc. The lamination direction of the insulating layer 11 is a direction parallel to the first and second end surfaces 15, 16 and the bottom surface 17 of the element body 10 (Y direction). Therefore, the insulating layers 11 have a layer shape extending in an X-Z plane. As used herein, the term "parallel" refers not only to a strictly parallel relationship but also to a substantially parallel relationship in consideration of a realistic variation range. In the element body 10, an interface between the multiple insulating layers 11 may not be clear due to firing etc.

The first external electrode 30 and the second external electrode 40 are made of a conductive material such as Ag, Cu, Au, and an alloy mainly composed thereof, for example. The first external electrode 30 has an L-shape formed from the first end surface 15 to the bottom surface 17. The first external electrode 30 is embedded in the element body 10 so as to be exposed from the first end surface 15 and the bottom surface 17. The second external electrode 40 has an L-shape formed from the second end surface 16 to the bottom surface 17. The second external electrode 40 is embedded in the element body 10 so as to be exposed from the second end surface 16 and the bottom surface 17.

The first external electrode 30 and the second external electrode 40 have a configuration in which multiple first external electrode conductor layers 33 and second external electrode conductor layers 43 embedded in the element body 10 (the insulating layer 11) are laminated. The first external electrode conductor layers 33 extend along the first end surface 15 and the bottom surface 17, and the second external electrode conductor layers 43 extend along the second end surface 16 and the bottom surface 17. As a result, the external electrodes 30, 40 can be embedded in the element body 10, so that the inductor component can be reduced in size as compared to the configuration in which the external electrodes are externally attached to the element body 10. Additionally, the coil 20 and the external electrodes 30, 40 can be formed in the same steps, so that variations in the positional relationship between the coil 20 and the first and second external electrodes 30, 40 can be reduced to decrease variations in electrical characteristics of the inductor component 1. With the above configuration, the first external electrode 30 is disposed to extend from the first end surface 15 to the bottom surface 17. The second external electrode 40 is disposed to extend from the second end surface 16 to the bottom surface 17. With the configuration described above, the external electrodes 30, 40 can be embedded in the element body 10, so that the inductor component can be reduced in size as compared to the configuration in which the external electrodes are externally attached to the element body 10. Additionally, the coil 20 and the external electrodes 30, 40 can be formed in the same steps, so that variations in the positional relationship between the coil 20 and the first and second external electrodes 30, 40 can be reduced to decrease variations in electrical characteristics of the inductor component 1.

The coil 20 is made of, for example, the same conductive material as the first and second external electrodes 30, 40. The coil 20 is helically wound along the lamination direction (Y direction) of the insulating layer 11. The coil 20 is disposed so that the axial direction is parallel to the first end surface 15, the second end surface 16, the bottom surface 17, and the top surface 18. The axial direction of the coil 20 refers to a direction parallel to a central axis of a helix formed by winding the coil 20. A first end of the coil 20 is connected to the first external electrode 30, and the other end of the coil 20 is connected to the second external electrode 40. In this embodiment, the coil 20 and the first and second external electrodes 30, 40 are integrated without a clear boundary; however, this is not a limitation, and the coil and the external electrodes may be made of different materials or by different construction methods so that boundaries may exist.

The coil 20 has a first coil wiring 21 wound along a plane orthogonal to the axial direction, a second coil wiring 22 adjacent to the first coil wiring 21 in the axial direction and wound along a plane orthogonal to the axial direction, and a via electrode 26 connecting the first coil wiring 21 and the second coil wiring 22. The first coil wiring 21 and the second coil wiring 22 are connected via the via electrode 26 to form a helix. An end portion on one side of the first coil wiring 21 (the end portion opposite to the side to which the via electrode 26 is connected) is connected to the second external electrode 40. An end portion on one side of the second coil wiring 22 (the end portion opposite to the side to which the via electrode 26 is connected) is connected to the first external electrode 30.

The first coil wiring 21 is formed by being wound on a principal surface (X-Z plane) of the insulating layer 11 orthogonal to the axial direction. The number of turns of the coil wiring 21 is less than one or may be one or more. As indicated by a virtual line of FIG. 1, the first coil wiring 21 is made up of three coil conductor layers 21*a*, 21*b*, 21*c* laminated in the axial direction in surface contact with each other. As a result, the aspect ratio of the first coil wiring 21 can be made higher. Each of the coil conductor layers 21*a*, 21*b*, 21*c* is wound along a plane orthogonal to the axial direction. In this embodiment, the coil conductor layers 21*a*, 21*b*, and 21*c* are integrated without a clear boundary; however, this is not a limitation, and the coil conductor layers may be made of different materials or by different construction methods so that boundaries may exist. The first coil wiring 21 may be made up of one coil conductor layer or may be made up of two or four or more coil conductor layers.

The first coil wiring 21 has a first thick portion 211 having an aspect ratio greater than 1.00, and a first thin portion 212 that is an end portion of the first coil wiring 21 and that has an average thickness smaller than the thickness of the first thick portion 211.

The first thick portion 211 is a portion of the first coil wiring 21 having an aspect ratio greater than 1.00. Specifically, in this embodiment, as shown in FIG. 1, the first thick portion 211 is formed by laminating in the axial direction the coil conductor layer 21*a*, the coil conductor layer 21*b*, and a portion of the coil conductor layer 21*c* excluding a portion serving as the first thin portion 212. The aspect ratio of the first thick portion 211 is (thickness of the first thick portion 211)/(width of the first thick portion 211).

Figure 5A:
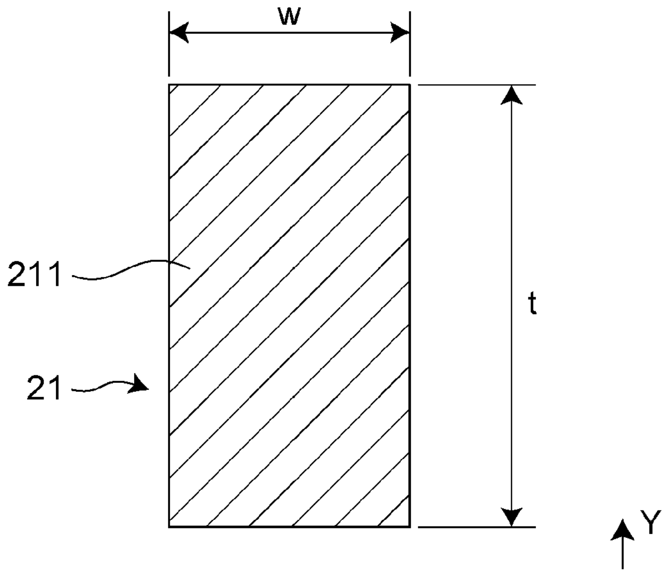
FIG. 5A is a cross-sectional view taken along a line A-A of FIG. 3 and is a cross-sectional view of a thick portion of a coil wiring.

FIG. 5A is a cross-sectional view taken along a line A-A of FIG. 3 and is a cross-sectional view of the first thick portion of the first coil wiring. As shown in FIG. 5A, the "thickness of the first thick portion 211" refers to a dimension tin the axial direction (Y direction) of the coil in a cross section orthogonal to the extending direction of the first thick portion 211. The "width of the first thick portion 211" refers to a dimension w in a direction orthogonal to the axial direction of the coil in a cross section orthogonal to the extending direction of the first thick portion 211. The first thick portion 211 is formed in a substantially circular shape when viewed in the axial direction of the coil 20; however, the present disclosure is not limited to this shape. The shape of the first thick portion 211 may be circular, elliptical, rectangular, or other polygonal shapes, for example.

In FIG. 5A, the cross section of the first thick portion 211 has a rectangular shape; however, the actual first thick portion 211 may not have a rectangular shape. Even in this case, the aspect ratio of the first thick portion 211 can be calculated from the cross-sectional area of the first thick portion 211 and the maximum thickness of the first thick portion 211 in the axial direction. Specifically, the thickness t may be the maximum thickness of the first thick portion 211 in the axial direction, and the width w may be a value obtained by dividing the cross-sectional area of the first thick portion 211 by the maximum thickness of the first thick portion 211. As a result, the aspect ratio can easily be obtained even if an inner surface or an outer surface of the first thick portion 211 has irregularities. As described above, the cross-sectional shape of the first thick portion 211 is not limited to a rectangular shape and may be an elliptical shape, a polygonal shape, or these shapes having irregularities. The same applies to respective cross sections orthogonal to the extending direction of a second thick portion 221, the first thin portion 212, and a second thin portion 222 described later.

The first thin portion 212 is a portion of the first coil wiring 21 having an average thickness less than the thickness of the first thick portion 211. As shown in FIGS. 1 to 4, the first thin portion 212 continuously extends from the first thick portion 211 along the extending direction of the first thick portion 211 when viewed in the axial direction. In this embodiment, the first thin portion 212 is made up of a portion of the coil conductor layer 21*c* occupying the end portion of the first coil wiring 21 (the end portion opposite to the side to which the second external electrode 40 is connected). The average thickness ($t_{ave}$) of the first thin portion 212 is (cross-sectional area of the first thin portion 212)/(wiring length of the first thin portion 212 along the extending direction of the first thin portion 212 in the cross section of the first thin portion 212).

Figure 5B:
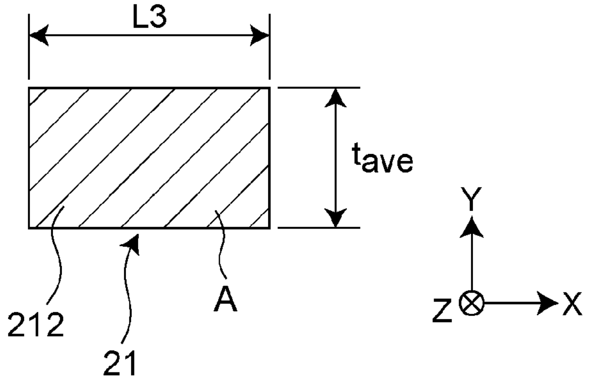
FIG. 5B is a cross-sectional view taken along a line B-B of FIG. 3 and is a cross-sectional view of a thin portion of the coil wiring.

FIG. 5B is a cross-sectional view taken along a line B-B of FIG. 3 and is a cross-sectional view of the first thin portion of the first coil wiring. As shown in FIG. 5B, the "cross-sectional area of the first thin portion 212" refers to an area A of a cross section that is parallel to the axial direction (Y direction) of the coil, that includes the center of the via electrode when viewed in the axial direction of the coil, and that is parallel to the extending direction of the first thin portion 212. The "wiring length of the first thin portion 212 along the extending direction of the first thin portion 212 in the cross section of the first thin portion 212" refers to a width L3 of the cross section shown in FIG. 5B.

As shown in FIGS. 1 to 4, in this embodiment, the first thin portion 212 continuously extends from the first thick portion 211, and has a tip formed in a circular arc shape when viewed in the axial direction. However, the shape of the first thin portion 212 is not limited thereto, and various shapes such as a circle and a rectangle can be adopted when viewed in the axial direction. As shown in FIG. 4, the shape of the first thin portion 212 is a quadrangle when viewed from the bottom surface side of the inductor component 1. The first thick portion 211 and the first thin portion 212 are adjacent to each other and integrally formed. The phrase "integrally formed" means that two members are continuously formed and that no interface is formed. As a result, the strength of the first coil wiring 21 can be increased. The first thick portion 211 and the first thin portion 212 may be formed as separate portions.

The second coil wiring 22 has the same configuration as the first coil wiring 21. Therefore, the second coil wiring 22 has the second thick portion 221 having an aspect ratio greater than 1.00, and the second thin portion 222 that is an end portion of the second coil wiring 22 and that has an average thickness smaller than the thickness of the second thick portion 211. The second thick portion 221 and the second thin portion 222 are integrally formed adjacent to each other. As a result, the strength of the second coil wiring 22 can be increased. The second thick portion 221 and the second thin portion 222 may be formed as separate portions. The configurations of the second thick portion 221 and the second thin portion 222 are the same as the configurations of the first thick portion 211 and the first thin portion 212, respectively, and therefore will not be described in detail.

As shown in FIG. 4, the via electrode 26 has one end in the axial direction connected to a surface S1 on the second side surface 14 side of the first thin portion 212, and the other end in the axial direction connected to a surface S2 on the first side surface 13 side of the second thin portion 222.

As a result, the via electrode 26 connects the first thin portion 212 and the second thin portion 222. In this embodiment, the via electrode 26 has a columnar shape. However, the shape of the via electrode 26 is not limited thereto and may be another shape such as a column having an elliptical cross section or a column having a polygonal cross section.

According to the embodiment, the first coil wiring 21 has the first thick portion 211 and the first thin portion 212, and the second coil wiring 22 has the second thick portion 221 and the second thin portion 222. The via electrode 26 is connected to each of the first thin portion 212 and the second thin portion 222. The average thickness of the first thin portion 212 in the axial direction is smaller than the thickness of the first thick portion 211 in the axial direction, and the average thickness of the second thin portion 222 in the axial direction is smaller than the thickness of the second thick portion 221 in the axial direction. Therefore, the first thin portion 212 and the second thin portion 222 has a smaller amount of contraction in the axial direction during firing as compared to the first thick portion 211 and the second thick portion 221, so that a stress of the via electrode generated during firing can be reduced. Therefore, the via electrode 26 can be prevented from peeling off from the first coil wiring 21 and the second coil wiring 22 during firing.

Preferably, as shown in FIG. 3, the via electrode 26 is arranged so that a distance L1 between the via electrode 26 and the bottom surface 17 is 50% or less of a distance L2 between the bottom surface 17 and the top surface 18. The distance L1 refers to a distance between the center of the via electrode 26 and the bottom surface 17 when viewed in the axial direction.

According to the configuration, since the via electrode 26 is arranged within 50% or less of the distance between the bottom surface 17 and the top surface 18, the first thin portion 212 and the second thin portion 222 having a relatively small average thickness are also arranged at a position within 50% or less of the distance between the bottom surface 17 and the top surface 18. Therefore, in this case, the via electrode 26 as well as the first thin portion 212 and the second thin portion 222 connected to the via electrode 26 are relatively close to the board (not shown) mounted on the bottom surface 17 side of the inductor component 1, so that a stray capacitance is easily generated with the board. However, since the first thin portion 212 and the second thin portion 222 smaller than the thickness of the first thick portion 211 and the second thick portion 221 reduces an area facing the board, so that the influence of the stray capacitance can be reduced. In contrast, when the first coil wiring 21 and the second coil wiring 22 are made up only of the first thick portion 211 and the second thick portion 221, respectively, the influence of the stray capacitance becomes larger.

Preferably, the aspect ratio of at least one of the first thick portion 211 and the second thick portion 221 is 1.08 or more and 2.54 or less (i.e., from 1.08 to 2.54).

According to the configuration, the Q value can be increased.

Preferably, the aspect ratio of at least one of the first thin portion 212 and the second thin portion 222 is 1.00 or less. The aspect ratio of the first thin portion 212 is (average thickness of the first thin portion 212)/(width of the first thin portion 212). The width of the first thin portion 212 refers to a dimension in a direction orthogonal to the axial direction in a cross section orthogonal to the extending direction of the first thin portion 212. As described above, in this embodiment, the tip of the first thin portion 212 in the extending direction has a circular arc shape when viewed in the axial direction. Therefore, the width of the first thin portion 212 is not constant in the extending direction of the first thin portion 212. In this case, the "cross section orthogonal to the extending direction of the first thin portion 212" may be a cross section of a portion of the first thin portion 212 connected to the first thick portion 211, which is orthogonal to the extending direction of the first thin portion 212. The aspect ratio of the second thin portion 222 is similarly defined.

According to the configuration, the stress generated in the via electrode 26 during firing can more effectively be reduced.

Preferably, the first thin portion 212 at least includes a portion corresponding to an entire region overlapping with the end portion side of the second coil wiring 22 when viewed in the axial direction, on the end portion side of the first coil wiring 21. The second thin portion 222 at least includes a portion corresponding to an entire region overlapping with the end portion side of the first coil wiring 21 when viewed in the axial direction, on the end portion side of the second coil wiring 22. More specifically, referring to FIG. 3, the first thin portion 212 includes the whole of a shaded region that is a region overlapping with the end portion side of the second coil wiring 22, on the end portion side of the first coil wiring 21. The second thin portion 222 includes the whole of the shaded region that is a region overlapping with the end portion side of the first coil wiring 21, on the end portion side of the second coil wiring 22. In FIG. 3, diagonal lines are added for convenience of explanation.

According to the configuration, the stress generated in the via electrode 26 during firing can more effectively be reduced.

Preferably, the shape of the end surface of the via electrode 26 connected to each of the first thin portion 212 and the second thin portion 222 is circular, and the diameter of the end surface is 30 μm or more and 50 μm or less (i.e., from 30 μm to 50 μm).

According to the configuration, an area of connection of the via electrode 26 to the first thin portion 212 and the second thin portion 222 can be ensured, so that connection reliability can be improved.

Preferably, the thickness of the first thick portion 211 is twice or more and five times or less (i.e., from twice to five times) the average thickness of the first thin portion 212, and the thickness of the second thick portion 221 is twice or more and five times or less (i.e., from twice to five times) the average thickness of the second thin portion 222.

According to the configuration, the stress of the via electrode 26 generated during firing can further be reduced, and a decrease in the electrical resistivity of the first coil wiring and the second coil wiring can be suppressed.

Second Embodiment

Figure 6:
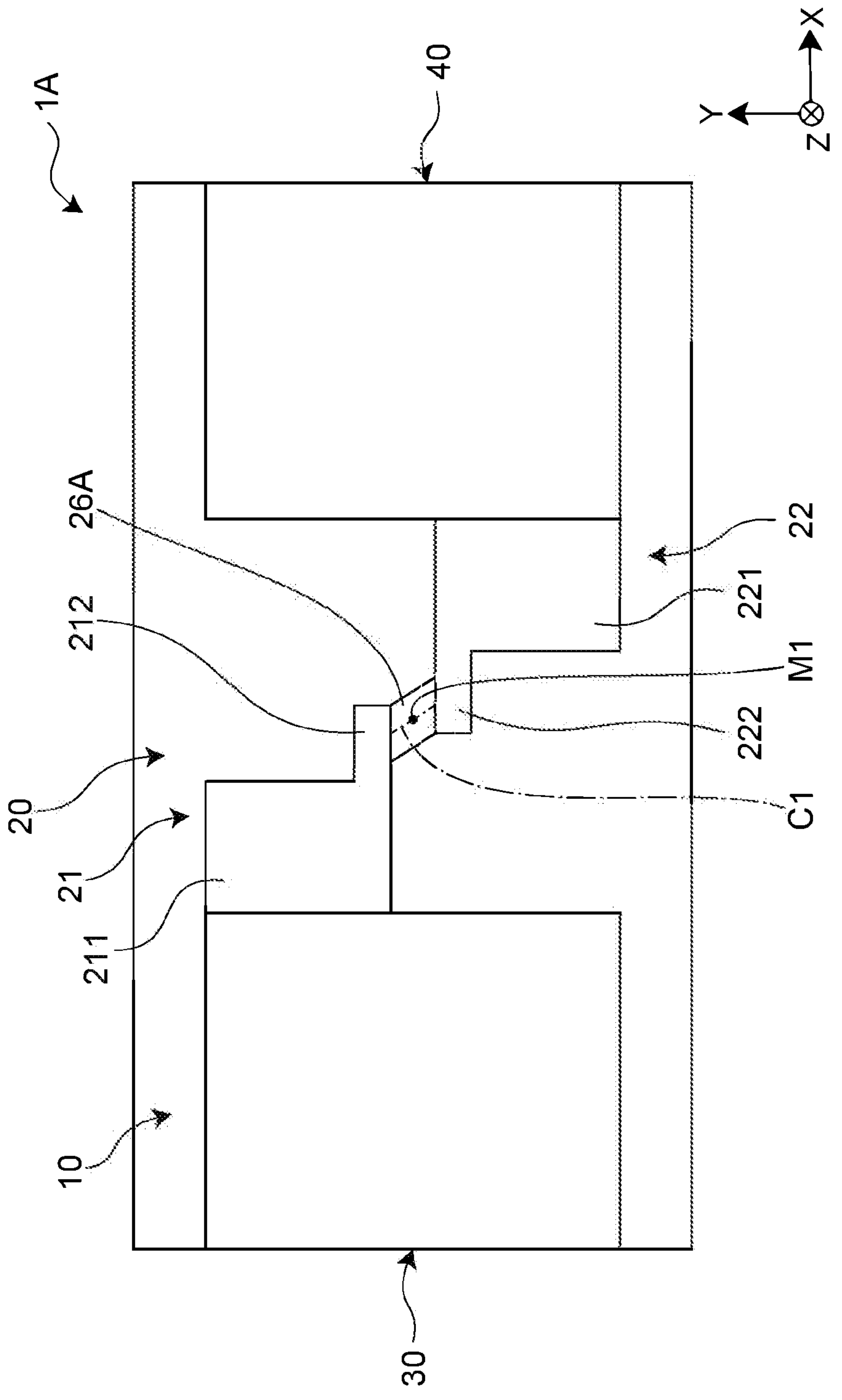
FIG. 6 is a transparent perspective view showing a second embodiment of the inductor component viewed from the bottom surface side.

FIG. 6 is a transparent bottom view showing a second embodiment of the inductor component viewed from the bottom side. The second embodiment is different from the first embodiment in the shape of the via electrode. This different configuration will hereinafter be described. The other constituent elements have the same configuration as the first embodiment and are denoted by the same reference numerals as the first embodiment and will not be described.

As shown in FIG. 6, a via electrode 26A of an inductor component 1A of the second embodiment has a central axis C1 inclined relative to the axial direction when viewed in a direction orthogonal to the axial direction (Y direction) and passing through a midpoint M1 of the central axis C1 of the via electrode 26A. The central axis C1 of the via electrode 26A refers to a line passing through the center of the via electrode 26A in a direction in which the via electrode 26A extends from the first thin portion 212 toward the second thin portion 222. On the other hand, the via electrode 26 of the first embodiment has the central axis parallel to the axial direction when viewed in a direction orthogonal to the axial direction and passing through the midpoint of the central axis of the via electrode 26. In this embodiment, while the via electrode 26A has the central axis C1 inclined relative to the axial direction when viewed in the direction orthogonal to the axial direction and passing through the midpoint M1 of the central axis C1 of the via electrode 26A, the direction of inclination of the central axis C1 is not particularly limited as long as the central axis C1 is inclined relative to the axial direction, and the central axis C1 may be inclined relative to the axial direction when viewed in any direction.

According to the embodiment, since the via electrode 26A is inclined, the stress generated in the via electrode 26A during firing can be dispersed in the inclination direction. Since the via electrode 26A is inclined, the area of connection of the via electrode 26A to the first thin portion 212 and the second thin portion 222 can be increased. Therefore, the via electrode 26A can be prevented from peeling off from the first coil wiring 21 and the second coil wiring 22 during firing.

Third Embodiment

Figure 7:
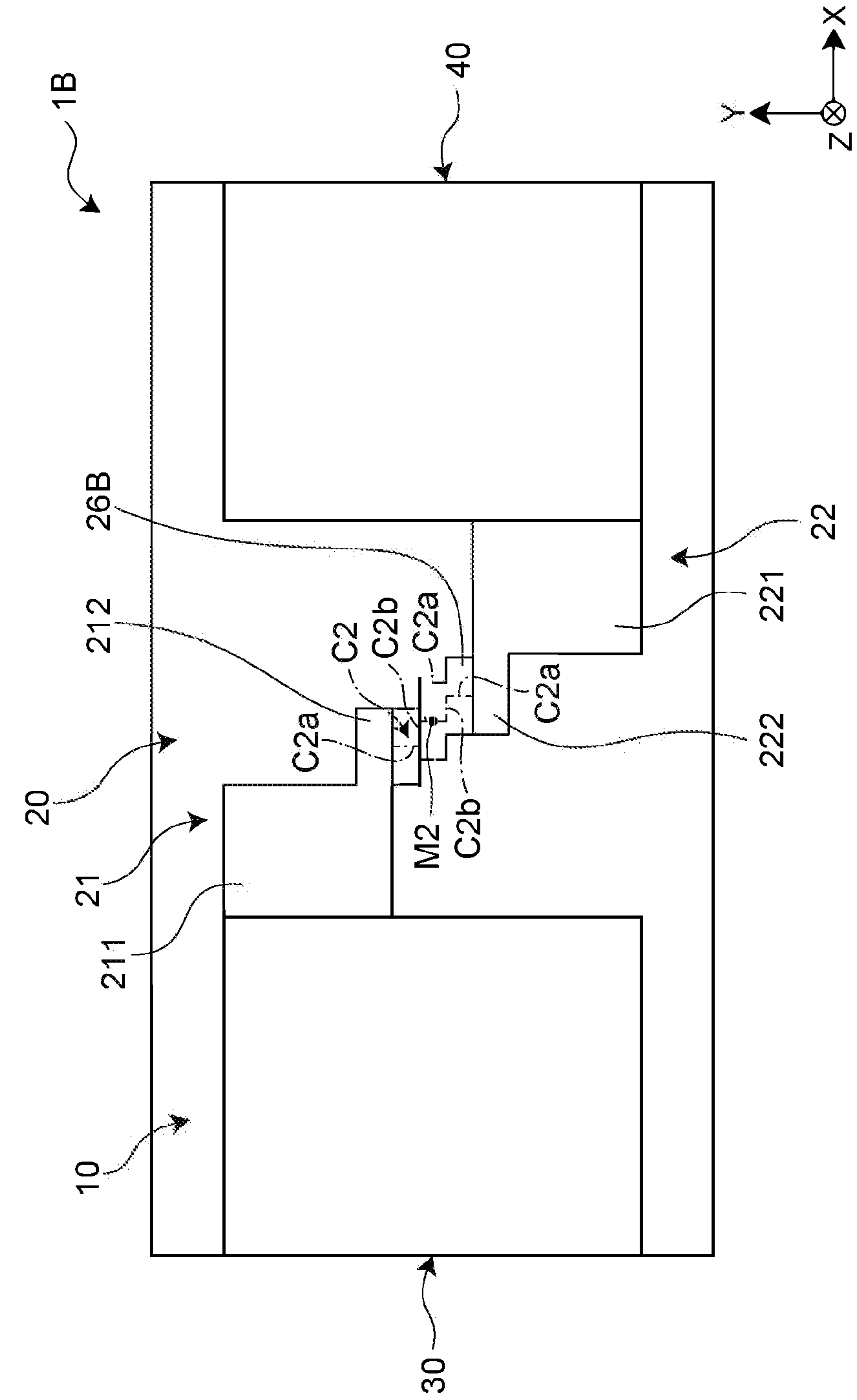
FIG. 7 is a transparent perspective view showing a third embodiment of the inductor component viewed from the bottom surface side.

FIG. 7 is a transparent bottom view showing a third embodiment of the inductor component viewed from the bottom surface side. The third embodiment is different from the first embodiment in the shape of the via electrode. This different configuration will hereinafter be described. The other constituent elements have the same configuration as the first embodiment and are denoted by the same reference numerals as the first embodiment and will not be described.

As shown in FIG. 7, a via electrode 26B of an inductor component 1B of the third embodiment has a central axis C2 inclined stepwise relative to the axial direction due to alternate repetition of a portion C2*a* extending in a direction parallel to the axial direction and a portion C2*b* extending in a direction orthogonal to the axial direction when viewed in a direction orthogonal to the axial direction (Y direction) and passing through a midpoint M2 of the central axis C2 of the via electrode 26B. In this embodiment, while the via electrode 26B has the central axis C2 inclined stepwise relative to the axial direction when viewed in the direction orthogonal to the axial direction and passing through the midpoint M2 of the central axis C2 of the via electrode 26B, the direction of inclination of the central axis C2 is not particularly limited as long as the central axis C2 is inclined stepwise relative to the axial direction, and the central axis C2 may be inclined stepwise relative to the axial direction when viewed in any direction.

According to the embodiment, the inclined via electrode can easily be manufactured by using a photolithography step. Since the via electrode 26B extends in an inclined manner relative to the axial direction, the stress generated in the via electrode 26B during firing can be dispersed in the inclined direction. Therefore, the via electrode 26B can be prevented from peeling off from the first coil wiring 21 and the second coil wiring 22 during firing.

Fourth Embodiment

Figure 8:
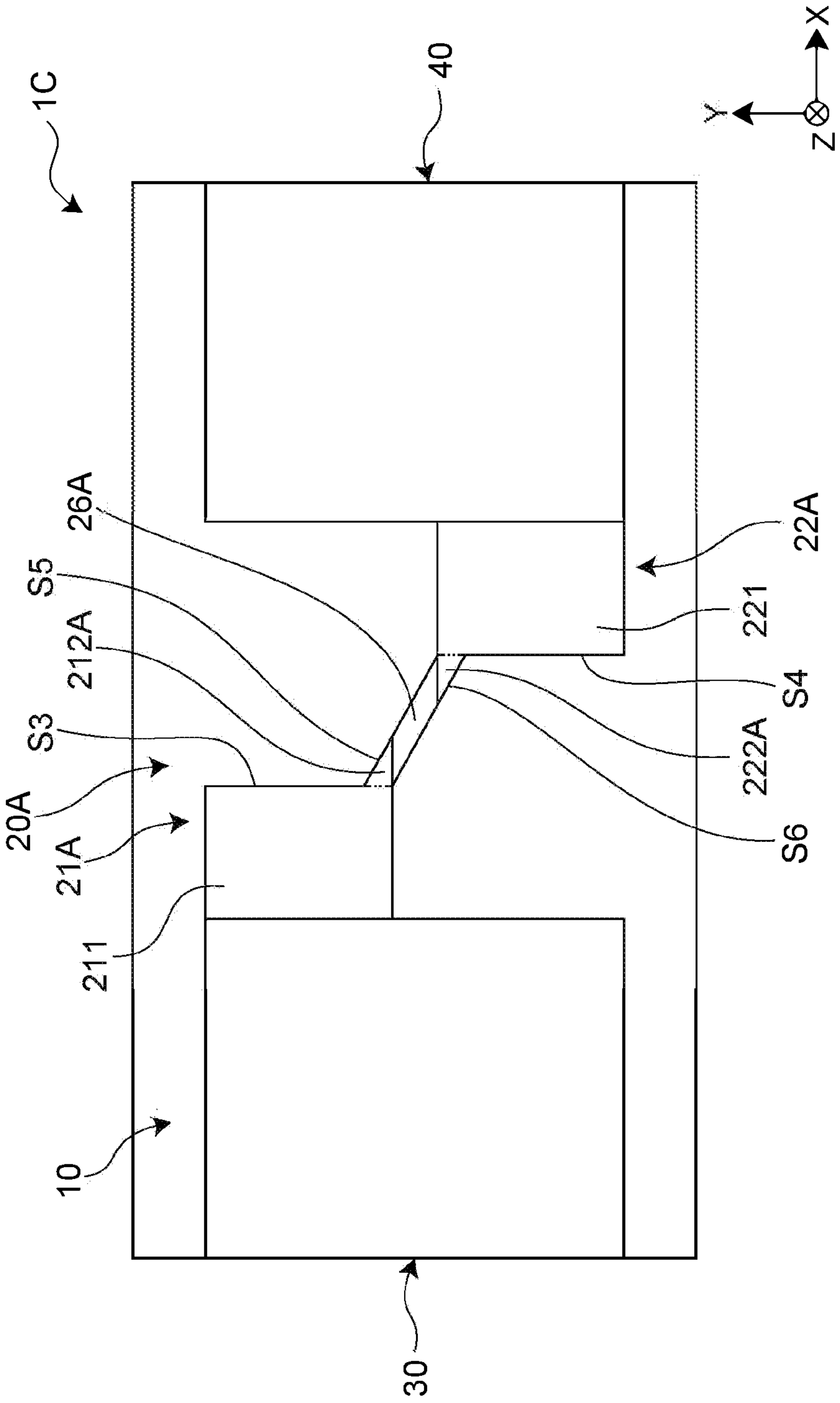
FIG. 8 is a transparent perspective view showing a fourth embodiment of the inductor component viewed from the bottom surface side.
Figure 9:
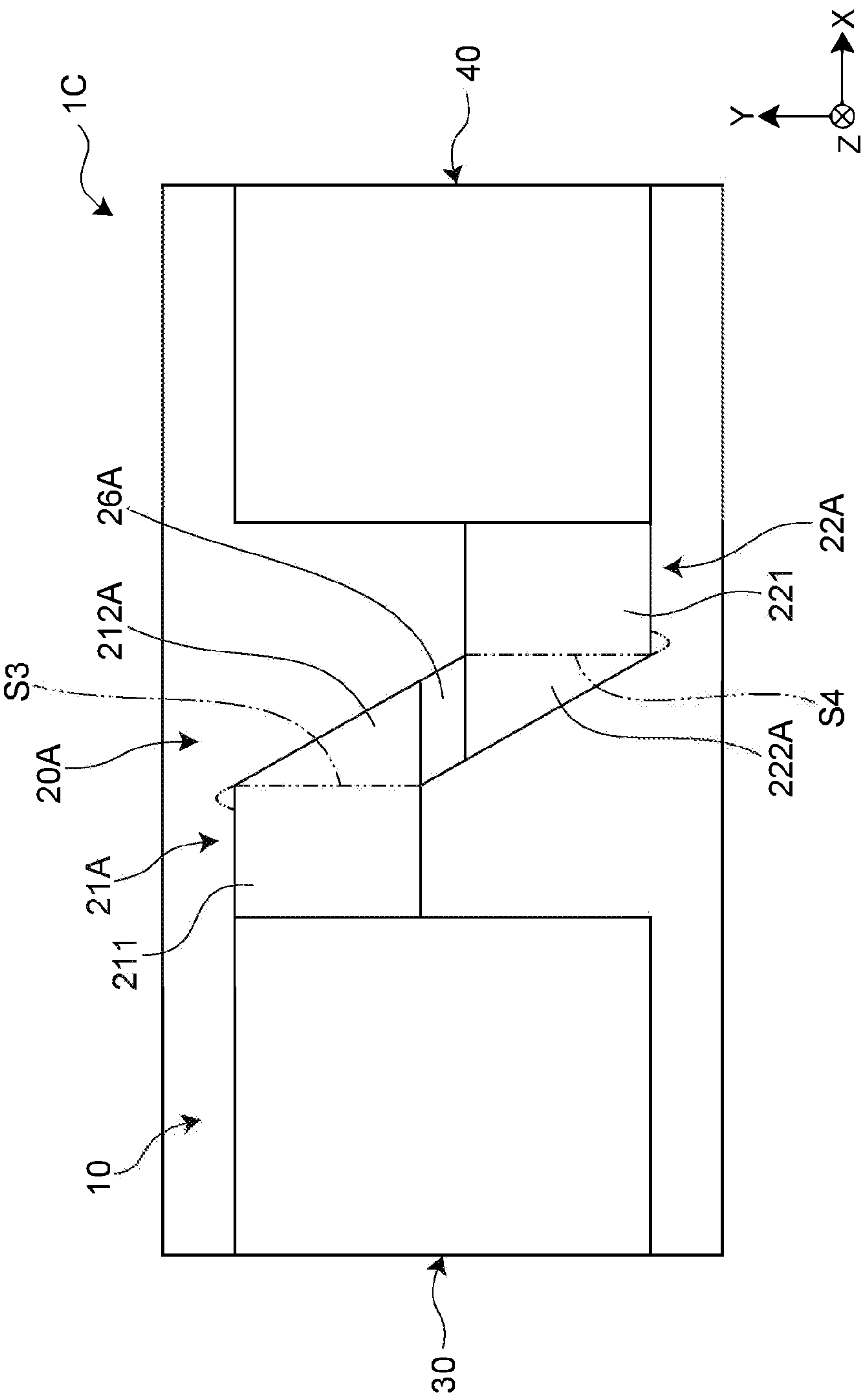
FIG. 9 is a transparent perspective view showing the fourth embodiment of the inductor component viewed from the bottom surface side.

FIGS. 8 and 9 are transparent bottom views showing a fourth embodiment of the inductor component viewed from the bottom surface side. The fourth embodiment is different from the first embodiment in the shapes of the first thin portion and the second thin portion. This different configuration will hereinafter be described. The other constituent elements have the same configuration as the second embodiment and are denoted by the same reference numerals as the second embodiment and will not be described.

As shown in FIG. 8, a thickness of a first thin portion 212A of an inductor component 1C of the fourth embodiment decreases along the extending direction of the first coil wiring 21A, which is a direction from an end portion of the first coil wiring 21A on the side to which the second external electrode 40 is connected toward an end portion on the side to which the via electrode 26A is connected. The "thickness of the first thin portion 212A" refers to the thickness in the axial direction of the coil in a cross section orthogonal to the extending direction of the first thin portion 212A. In this embodiment, the thickness of the first thin portion 212A continuously decreases. Specifically, the first thin portion 212A has an inclined surface S5 on a surface located on the side opposite to the surface to which the via electrode 26A is connected in the axial direction. In other words, the shape of the first thin portion 212A is triangular when viewed from the bottom surface side of the inductor component 1C.

The first thin portion 212A is connected to a portion of an end surface S3 in the extending direction of the first thick portion 211. As a result, the thickness of the first thin portion 212A further decreases, and the amount of contraction of the first thin portion 212A during firing can further be reduced.

As shown in FIG. 8, a thickness of a second thin portion 222A of the inductor component 1C of the fourth embodiment decreases along the extending direction of the second coil wiring 22A, which is a direction from an end portion of the second coil wiring 22A on the side to which the first external electrode 30 is connected toward an end portion on the side to which the via electrode 26A is connected. The "thickness of the second thin portion 222A" refers to the thickness in the axial direction of the coil in a cross section orthogonal to the extending direction of the second thin portion 222A. In this embodiment, the thickness of the second thin portion 222A continuously decreases. Specifically, the second thin portion 222A has an inclined surface S6 on a surface located on the side opposite to the surface to which the via electrode 26A is connected in the axial direction. In other words, the shape of the second thin portion 222A is triangular when viewed from the bottom surface side of the inductor component 1C.

The second thin portion 222A is connected to a portion of an end surface S4 in the extending direction of the second thick portion 221. As a result, the thickness of the second thin portion 222A further decreases, and the amount of contraction of the second thin portion 222A during firing can further be reduced.

According to the above embodiment, since the thickness of the first thin portion 212A decreases along the extending direction of the first coil wiring 21A, which is a direction from the end portion of the first coil wiring 21A on the side to which the second external electrode 40 is connected toward the end portion on the side to which the via electrode 26A is connected, the stress generated in the via electrode 26A during firing can be dispersed. Particularly, since the thickness of the first thin portion 212A continuously decreases, the stress generated in the via electrode 26A during firing can more effectively be dispersed. Additionally, since the thickness of the second thin portion 222A decreases along the extending direction of the second coil wiring 22A, which is a direction from the end portion of the second coil wiring 22A on the side to which the first external electrode 30 is connected toward the end portion on the side to which the via electrode 26A is connected, the stress generated in the via electrode 26A during firing can be dispersed. Particularly, since the thickness of the second thin portion 222A continuously decreases, the stress generated in the via electrode 26A during firing can more effectively be dispersed.

As shown in FIG. 9, the first thin portion 212A may be connected to the entire end surface S3 in the extending direction of the first thick portion 211. As a result, a stress difference between the first thick portion 211 and the first thin portion 212A becomes smaller during firing, and a damage such as cracking between the first thick portion 211 and the first thin portion 212A can be suppressed. Similarly, the second thin portion 222A may be connected to the entire end surface S4 in the extending direction of the second thick portion 221. As a result, a stress difference between the second thick portion 221 and the second thin portion 222A becomes smaller during firing, and a damage such as cracking between the second thick portion 221 and the second thin portion 222A can be suppressed. As indicated by curve virtual lines (dashed-two dotted lines) in FIG. 9, a part of the first thin portion 212A and a part of the second thin portion 222A may overlap with a part of the first thick portion 211 and a part of the second thick portion 221, respectively, in a printing lamination step.

The present disclosure is not limited to the embodiments described above and may be changed in design without departing from the spirit of the present disclosure. For example, respective feature points of the first to fourth embodiments may variously be combined.

In the embodiments, the axis of the coil is orthogonal to the side surfaces of the element body; however, the axis may be orthogonal to the end surface of the element body or may be orthogonal to the bottom surface of the element body.

In the embodiments, the coil has two coil wirings, i.e., the first coil wiring and the second coil wiring; however, the number of coil wirings is not limited thereto and may be three or more.

In the embodiments, the first and second external electrodes are L-shaped; however, the external electrodes may be five-sided electrodes, for example. Therefore, the first external electrode may be disposed on the entire first end surface and a portion of each of the first side surface, the second side surface, the bottom surface, and the top surface, and the second external electrode may be disposed on the entire second end surface and a portion of each of the first side surface, the second side surface, the bottom surface, and the top surface. Alternatively, the first external electrode and the second external electrode may each be disposed on a portion of the bottom surface.

In the embodiment, the first thin portion at least includes a portion corresponding to the entire region overlapping with the end portion side of the second coil wiring when viewed in the axial direction, and the second thin portion at least includes a portion corresponding to the entire region overlapping with the end portion side of the first coil wiring when viewed in the axial direction. However, the first thin portion may include a part of a portion corresponding to the region overlapping with the end portion side of the second coil wiring when viewed in the axial direction, on the end portion side of the first coil wiring. The second thin portion may include a part of a portion corresponding to the region overlapping the end portion side of the first coil wiring when viewed in the axial direction, on the end portion side of the second coil wiring. Alternatively, the first thin portion of the first coil wiring may not overlap with the second thin portion of the second coil wiring when viewed in the axial direction.

In the embodiments, the via electrode connected to the first thin portion and the second thin portion is arranged within 50% or less of the distance between the bottom surface and the top surface; however, if another via electrodes not connected to the first thin portion and the second thin portion exists, the other via electrode may be arranged to exceed 50% of the distance between the bottom surface and the top surface. Alternatively, the via electrode connected to the first thin portion and the second thin portion may be arranged to exceed 50% of the distance between the bottom surface and the top surface. This increases a degree of freedom in design.

In the fourth embodiment, the thicknesses of the first thin portion 212A and the second thin portion 222A continuously reduce; however, the thicknesses may decrease stepwise. The thickness of only one of the first thin portion 212A and the second thin portion 222A may decrease.

Example

An example of a method for manufacturing the inductor component 1 will hereinafter be described.

First, an insulating layer is formed by repeatedly applying an insulating paste mainly composed of borosilicate glass onto a base material such as a carrier film by screen printing. This insulating layer serves as an outer-layer insulating layer located outside coil conductor layers. The base material is peeled off from the insulating layer at an arbitrary step and does not remain in the state of the inductor component.

Subsequently, a photosensitive conductive paste layer is applied and formed on the insulating layer to form a coil conductor layer and an external electrode conductor layer by a photolithography step. Specifically, the photosensitive conductive paste containing Ag as a main metal component is applied onto the insulating layer by screen printing to form the photosensitive conductive paste layer. Ultraviolet rays etc. are then applied through a photomask to the photosensitive conductive paste layer and followed by development with an alkaline solution etc. As a result, the coil conductor layer and the external electrode conductor layer are formed on the insulating layer. At this step, the coil conductor layer and the external electrode conductor layer can be drawn into a desired pattern with the photomask.

A photosensitive insulating paste layer is applied and formed on the insulating layer to form an insulating layer provided with an opening and a via hole by a photolithography step. Specifically, a photosensitive insulating paste is applied onto the insulating layer by screen printing to form the photosensitive insulating paste layer. Ultraviolet rays etc. are then applied through a photomask to the photosensitive insulating paste layer and followed by development with an alkaline solution etc. At this step, the photosensitive insulating paste layer is patterned so as to dispose the opening above the external electrode conductor layer and the via hole at an end portion of the coil conductor layer with the photomask. When the inclined via electrode 26A shown in FIGS. 6, 8, and 9 is formed, the via hole may be formed by laser processing or drilling, for example.

Subsequently, a photosensitive conductive paste layer is applied and formed on the insulating layer provided with the opening and the via hole to form a coil conductor layer and an external electrode conductor layer by a photolithography step. Specifically, a photosensitive conductive paste containing Ag as a main metal component is applied onto the insulating layer so as to fill the opening and the via hole by screen printing to form the photosensitive conductive paste layer. Ultraviolet rays etc. are then applied through a photomask to the photosensitive conductive paste layer and followed by development with an alkaline solution etc. This leads to the formation of the external electrode conductor layer connected through the opening to the external electrode conductor layer on the lower layer side, and the coil conductor layer connected through the via hole to the coil conductor layer on the lower layer side, on the insulating layer. When the stepped via electrode 26B shown in FIG. 7 is formed, the step of forming the insulating layer provided with the via hole and the step of forming the coil conductor layer connected through the via hole to the coil conductor layer on the lower layer side may be repeated while the position of the via hole is shifted in a direction orthogonal to the axial direction of the coil.

The steps of forming the insulating layer as well as the coil conductor layer and the external electrode conductor layer as described above are repeated to form a coil made up of the coil conductor layers formed on the multiple insulating layers and external electrodes made up of the external electrode conductor layers formed on the multiple insulating layers. An insulating layer is further formed by repeatedly applying an insulating paste by screen printing onto the insulating layer with the coil and the external electrodes formed. This insulating layer serves as an outer-layer insulating layer located outside the coil conductor layers. If sets of coils and external electrodes are formed in a matrix shape on the insulating layers in the steps described above, a mother laminated body can be acquired.

Subsequently, the mother laminated body is cut into multiple unfired laminated bodies by dicing etc. In the step of cutting the mother laminated body, the external electrodes are exposed from the mother laminated body on a cut surface formed by cutting. In this case, if a cut deviation occurs in a certain amount or more, the outer circumferential edge of the coil conductor layer formed in the step appears on the end surface or the bottom surface.

The unfired laminated bodies are fired under predetermined conditions to acquire element bodies including the coils and the external electrodes. These element bodies are subjected to barrel finishing for polishing into an appropriate outer shape size, and portions of the external electrodes exposed from the laminated bodies are subjected to Ni plating having a thickness of 2 μm to 10 μm and Sn plating having a thickness of 2 μm to 10 μm. Through the steps described above, inductor components of 0.4 mm×0.2 mm×0.2 mm are completed.

The construction method of forming the conductor pattern is not limited to the above method and may be, for example, a printing lamination construction method of a conductive paste using a screen printing plate opened in a conductor pattern shape, may be a method using etching for forming a pattern of a conductive film formed by a sputtering method, a vapor deposition method, pressure bonding of a foil, etc., or may be a method in which formation of a negative pattern is followed by formation of a conductor pattern with a plating film and subsequent removal of unnecessary portions as in a semi-additive method. Furthermore, by forming the conductor pattern in multiple stages to achieve a high aspect ratio, a loss due to resistance at high frequency can be reduced. More specifically, this may be a process of repeating the formation of the conductor pattern, may be a process of repeatedly laminating wirings formed by a semi-additive process, may be a process of forming a portion of lamination by a semi-additive process and forming the other portion by etching from a film grown by plating, or may be implemented by combining a process in which a wiring formed by a semi-additive process is further grown by plating to achieve a higher aspect ratio.

The conductive material is not limited to the Ag paste as described above and may be a good conductor such as Ag, Cu, and Au formed by a sputtering method, a vapor deposition method, pressure bonding of a foil, plating, etc. The method of forming the insulating layers as well as the openings and the via holes is not limited to the above method and may be a method in which after pressure bonding, spin coating, or spray application of an insulating material sheet, the sheet is opened by laser or drilling.

The insulating material is not limited to the grass and ceramic materials as described above and may be an organic material such as an epoxy resin, a fluororesin, and a polymer resin, or may be a composite material such as a glass epoxy resin although a material low in dielectric constant and dielectric loss is desirable.

The size of the inductor component is not limited to the above description. The method of forming the external electrodes is not limited to the method of applying plating to the external conductor exposed by cutting and may be a method including further forming external electrodes by dipping of a conductor paste, a sputtering method, etc. after cutting and then applying plating thereto.

What is claimed is:

1. An inductor component comprising:

an element body; and a coil disposed in the element body and helically wound along an axial direction, wherein the coil includes a first coil wiring wound along a plane orthogonal to the axial direction, a second coil wiring adjacent to the first coil wiring in the axial direction and wound along a plane orthogonal to the axial direction, and a via electrode connecting the first coil wiring and the second coil wiring, the first coil wiring has a first thick portion having an aspect ratio greater than 1.00, and a first thin portion that is an end portion of the first coil wiring and that has an average thickness smaller than the thickness of the first thick portion, the first thick portion and the first thin portion of the first coil wiring directly connect to an external electrode, the second coil wiring has a second thick portion having an aspect ratio greater than 1.00, and a second thin portion that is an end portion of the second coil wiring and that has an average thickness smaller than the thickness of the second thick portion, and the via electrode connects the first thin portion and the second thin portion.

2. The inductor component according to claim 1, wherein the via electrode has a central axis inclined relative to the axial direction.

3. The inductor component according to claim 2, wherein the first thin portion has a thickness decreasing along the extending direction of the first coil wiring, which is a direction from an end portion opposite to the end portion of the first coil wiring toward the end portion.

4. The inductor component according to claim 2, wherein the element body includes a first end surface, a second end surface opposite to the first end surface, a bottom surface connected between the first end surface and the second end surface, and a top surface opposite to the bottom surface, the inductor component further includes a first external electrode disposed to extend from the first end surface to the bottom surface, and a second external electrode disposed to extend from the second end surface to the bottom surface, the coil is disposed so that the axial direction is parallel to the first end surface, the second end surface, the bottom surface, and the top surface, one end of the coil is connected to the first external electrode while the other end of the coil is connected to the second external electrode, and the via electrode is arranged so that a distance between the via electrode and the bottom surface is 50% or less of a distance between the bottom surface and the top surface.

5. The inductor component according to claim 2, wherein at least one of the first thick portion and the second thick portion has an aspect ratio of from 1.08 to 2.54.

6. The inductor component according to claim 2, wherein at least one of the first thin portion and the second thin portion has an aspect ratio of 1.00 or less.

7. The inductor component according to claim 2, wherein the first thin portion at least includes a portion corresponding to an entire region overlapping with the end portion side of the second coil wiring when viewed in the axial direction, on the end portion side of the first coil wiring, and the second thin portion at least includes a portion corresponding to an entire region overlapping with the end portion side of the first coil wiring when viewed in the axial direction, on the end portion side of the second coil wiring.

8. The inductor component according to claim 1, wherein the via electrode has a central axis inclined stepwise relative to the axial direction due to alternate repetition of a portion extending in a direction parallel to the axial direction, and a portion extending in a direction orthogonal to the axial direction.

9. The inductor component according to claim 1, wherein the first thin portion has a thickness decreasing along the extending direction of the first coil wiring, which is a direction from an end portion opposite to the end portion of the first coil wiring toward the end portion.

10. The inductor component according to claim 9, wherein the thickness of the first thin portion continuously decreases.

11. The inductor component according to claim 1, wherein the element body includes a first end surface, a second end surface opposite to the first end surface, a bottom surface connected between the first end surface and the second end surface, and a top surface opposite to the bottom surface, the inductor component further includes a first external electrode disposed to extend from the first end surface to the bottom surface, and a second external electrode disposed to extend from the second end surface to the bottom surface, the coil is disposed so that the axial direction is parallel to the first end surface, the second end surface, the bottom surface, and the top surface, one end of the coil is connected to the first external electrode while the other end of the coil is connected to the second external electrode, and the via electrode is arranged so that a distance between the via electrode and the bottom surface is 50% or less of a distance between the bottom surface and the top surface.

12. The inductor component according to claim 1, wherein at least one of the first thick portion and the second thick portion has an aspect ratio of from 1.08 to 2.54.

13. The inductor component according to claim 1, wherein at least one of the first thin portion and the second thin portion has an aspect ratio of 1.00 or less.

14. The inductor component according to claim 1, wherein the first thin portion at least includes a portion corresponding to an entire region overlapping with the end portion side of the second coil wiring when viewed in the axial direction, on the end portion side of the first coil wiring, and the second thin portion at least includes a portion corresponding to an entire region overlapping with the end portion side of the first coil wiring when viewed in the axial direction, on the end portion side of the second coil wiring.

15. The inductor component according to claim 1, wherein the first thick portion and the first thin portion are adjacent to each other and integrally formed.

16. The inductor component according to claim 1, wherein the second thick portion and the second thin portion are adjacent to each other and integrally formed.

17. The inductor component according to claim 1, wherein a shape of an end surface of the via electrode connected to each of the first thin portion and the second thin portion is circular, and the end surface has a diameter of from 30 μm to 50 μm.

18. The inductor component according to claim 1, wherein the second thin portion has a thickness decreasing along the extending direction of the second coil wiring, which is a direction from an end portion opposite to the end portion of the second coil wiring toward the end portion.

19. An inductor component comprising:

an element body; and a coil disposed in the element body and helically wound along an axial direction, wherein the coil includes a first coil wiring wound along a plane orthogonal to the axial direction, a second coil wiring adjacent to the first coil wiring in the axial direction and wound along a plane orthogonal to the axial direction, and a via electrode connecting the first coil wiring and the second coil wiring, the first coil wiring has a first thick portion having an aspect ratio greater than 1.00, and a first thin portion that is an end portion of the first coil wiring and that has an average thickness smaller than the thickness of the first thick portion, the first thin portion has a thickness decreasing along the extending direction of the first coil wiring, which is a direction from an end portion opposite to the end portion of the first coil wiring toward the end portion, the second coil wiring has a second thick portion having an aspect ratio greater than 1.00, and a second thin portion that is an end portion of the second coil wiring and that has an average thickness smaller than the thickness of the second thick portion, and the via electrode connects the first thin portion and the second thin portion.

20. The inductor component according to claim 19, wherein the second thin portion has a thickness decreasing along the extending direction of the second coil wiring, which is a direction from an end portion opposite to the end portion of the second coil wiring toward the end portion.

21. The inductor component according to claim 20, wherein the thickness of the second thin portion continuously decreases.

* * * * *